United States Patent [19]

Bodmer et al.

[11] Patent Number: 4,610,727

[45] Date of Patent: Sep. 9, 1986

[54] RECORD MEMBER

[75] Inventors: Jerome R. Bodmer; Robert E. Miller, both of Appleton, Wis.

[73] Assignee: Appleton Papers Inc., Appleton, Wis.

[21] Appl. No.: 762,741

[22] Filed: Aug. 5, 1985

Related U.S. Application Data

[62] Division of Ser. No. 612,943, May 23, 1984, Pat. No. 4,540,998.

[51] Int. Cl.[4] .......................... C09D 11/00; B41M 5/16; B41M 5/22

[52] U.S. Cl. .......................... 106/21; 346/212; 346/216; 346/217; 346/225; 427/150; 427/152

[58] Field of Search .............. 346/212, 216, 217, 225; 427/150, 151, 152; 106/21

[56] References Cited

U.S. PATENT DOCUMENTS

| | | | |
|---|---|---|---|
| 4,076,887 | 2/1978 | Tsuji et al. | 346/216 |
| 4,165,102 | 8/1979 | Bodmer | 346/212 |

*Primary Examiner*—Amelia B. Yarbrough
*Attorney, Agent, or Firm*—E. Frank McKinney; Paul S. Phillips, Jr.

[57] ABSTRACT

A record member comprising a developer composition comprising a zinc-modified addition product of a phenol and a diolefinic alkylated or alkenylated cyclic hydrocarbon is disclosed. These addition products are particularly useful as color developers for basic chromogenic material.

15 Claims, No Drawings

RECORD MEMBER

This application is a division, of application Ser. No. 612,943, filed May 23, 1984 now U.S. Pat. No. 4,540,998.

This invention relates to the production of novel record material. More specifically, the invention involves sensitized record sheet material useful in developing dark-colored marks on contact with colorless solutions of basic chromogenic material (also called color formers). Such sheet material includes color developer material generally in the form of a coating on at least one sheet surface. The coating of color developer material serves as a receiving surface for colorless, liquid solutions of color formers which react, on contact, with the color developer material to produce the dark-colored marks.

Pressure-sensitive carbonless copy paper of the transfer type consists of multiple cooperating superimposed plies in the form of sheets of paper which have coated, on one surface of one such ply, pressure-rupturable microcapsules containing a solution of one or more color formers (hereinafter referred to as a CB sheet) for transfer to a second ply carrying a coating comprising one or more color developers (hereinafter referred to as a CF sheet). To the uncoated side of the CF sheet can also be applied pressure-rupturable microcapsules containing a solution of color formers resulting in a pressure-sensitive sheet which is coated on both the front and back sides (hereinafter referred to as a CFB sheet). When said plies are superimposed, one on the other, in such manner that the microcapsules of one ply are in proximity with the color developers of the second ply, the application of pressure, as by typewriter, sufficient to rupture the microcapsules, releases the solution of color former and transfers color former solution to the CF sheet resulting in image formation through reaction of the color former with the color developer. Such transfer systems and their preparation are disclosed in U.S. Pat. No. 2,730,456.

The use of certain biphenols as color developers in pressure-sensitive carbonless copy paper is disclosed in U.S. Pat. No. 3,244,550. U.S. Pat. No. 4,076,887 discloses a recording sheet comprising a developer consisting of a dimer of an alkenyl phenol.

U.S. Pat. No. 4,134,847 discloses a method for the production of a color developer essentially made from aromatic carboxylic acid, water-insoluble organic polymer and metal compound.

U.S. Pat. No. 3,732,120 discloses a method of making zinc-modified phenol novolak resins and their use as color-developing agents in pressure-sensitive record sheet material. U.S. Pat. Nos. 3,737,410; 4,165,102; and 4,165,103 disclose methods of making zinc-modified phenol-aldehyde novolak resins for use in pressure-sensitive record sheet material.

The use of a developer composition comprising an addition product of phenol and a diolefinic alkylated or alkenylated cyclic hydrocarbon, wherein the addition product has a hydroxyl number greater than about 120–140, is taught in a co-pending U.S. application filed on even date herewith in the name of Robert E. Miller and Steven L. Vervacke.

Although certain biphenol compounds have been suggested for use as color developers in pressure-sensitive carbonless copy paper, the compounds suggested have failed to overcome certain existing problems in carbonless copy paper or have proven to have defects of their own which make them unattractive as color developers in commercial carbonless copy paper systems. The greatest single problem of many of the biphenol color developers previously suggested has been their failure to provide an adequately intense image under conditions of use in carbonless copy paper systems. The second greatest defect of these suggested biphenol developers has been that, even if they were utilized in carbonless copy paper systems in such a manner that an adequately intense image was obtained initially, this ability to continue to provide an adequately intense print was seriously reduced merely upon the natural aging of the coated sheet (hereinafter referred to as CF decline).

Among the existing problems in carbonless copy systems which the previously-suggested biphenol developers have failed to overcome is speed of image formation.

It is therefore an object of the present invention to provide a record member having improved image intensity, both initially and upon aging.

Another object of the present invention is to provide a record member having improved speed of image formation.

Still another object of the present invention is to provide a record member comprising a substrate and an improved developer composition comprising a zinc-modified addition product of a phenol and a diolefinic alkylated or alkenylated cyclic hydrocarbon without limitation as to the hydroxyl number of the addition product.

In accordance with the present invention, it has been found that these and other objectives may be attained by employing a CF sheet which comprises a substrate coated with a developer composition comprising one or more zinc-modified addition products of phenol and a diolefinic alkylated or alkenylated cyclic hydrocarbon.

The developer composition comprising said zinc-modified addition product of phenol and a diolefinic alkylated or alkenylated cyclic hydrocarbon can be utilized in either a transfer carbonless copy paper system as disclosed hereinbefore or in a self-contained carbonless copy paper system such as disclosed in U.S. Pat. Nos. 2,730,457 and 4,167,346. Many of both types of carbonless copy paper systems are exemplified in U.S. Pat. No. 3,672,935. Of the many possible arrangements of the mark-forming components in the transfer type of carbonless copy paper system, the most commonly employed is the one wherein the developer composition includes the color developer, one or more mineral materials and one or more binders. These compositions are then applied in the form of a wet slurry to the surface of what becomes the underlying ply (the CF sheet) in the carbonless copy paper system. Such CF sheet color developer composition coatings are disclosed in U.S. Pat. Nos. 3,455,721; 3,732,120; 4,166,644; and 4,188,456. Another useful arrangement of the developer composition is to prepare a sensitizing solution of the developer material and apply the solution to the nap fibers of sheet paper as disclosed in U.S. Pat. No. 3,466,184. A suitable alternative is to apply such a sensitizing solution of developer material to a base-coated sheet wherein the base coating comprises a pigment material. Examples of such pigment material include calcium carbonate, kaolin clay, calcined kaolin clay, etc. and mixtures thereof.

Examples of eligible color formers for use with the color developers of the present invention, to develop dark colored marks on contact, include, but are not limited to, Crystal Violet Lactone [3,3-bis(4-dimethylaminophenyl)-6-dimethylaminophthalide (U.S. Pat. No. Re. 23,024)]; phenyl-, indol-, pyrrol-, and carbazol-substituted phthalides (for example, in U.S. Pat. Nos. 3,491,111; 3,491,112; 3,491,116; 3,509,174); nitro-, amino-, amido-, sulfon amido-, aminobenzylidene-, halo-, anilino-substituted fluorans (for example, in U.S. Pat. Nos. 3,624,107; 3,627,787; 3,641,011; 3,642,828; 3,681,390); spirodipyrans (U.S. Pat. No. 3,971,808); and pyridine and pyrazine compounds (for example, in U.S. Pat. Nos. 3,775,424 and 3,853,869). Other specifically eligible chromogenic compounds, not limiting the invention in any way, are: 3-diethylamino-6-methyl-7-anilinofluoran (U.S. Pat. No. 3,681,390); 7-(1-ethyl-2-methylindol-3-yl)-7-(4-diethylamino-2-ethoxyphenyl)-5,7-dihydrofuro[3,4-b]pyridin-5-one (U.S. Pat. No. 4,246,318); 3-diethylamino-7-(2-chloroanilino)fluoran (U.S. Pat. No. 3,920,510); 3-(N-methylcyclohexylamino)-6-methyl-7-anilinofluoran (U.S. Pat. No. 3,959,571); 7-(1-octyl-2-methylindol-3-yl)-7-(4-diethylamino-2-ethoxyphenyl)-5,7-dihydrofuro[3,4-b]pyridin-5-one; 3-diethylamino-7,8-benzofluoran; 3,3-bis(1-ethyl-2-methylindol-3-yl)phthalide; 3-diethylamino-7-anilinofluoran; 3-diethylamino-7-benzylaminofluoran; 3′-phenyl-7-dibenzylamino-2,2′-spiro-di[2H-1-benzopyran]; and mixtures of any two or more of the above.

Preferred among the addition products of phenol and a diolefinic alkylated or alkenylated cyclic hydrocarbon used in the present invention are those in which the cyclic hydrocarbon is a terpene. More preferred among said addition products are those in which the terpene is limonene.

A method of preparing terpene phenolic compounds by the reaction of a phenolic compound with a cyclic terpene in the presence of polyphosphoric acid is disclosed in U.S. Pat. No. 2,811,564.

The zinc modification process of the present invention comprises mixing together and heating an addition product of phenol and a diolefinic alkylated or alkenylated cyclic hydrocarbon, a zinc compound, benzoic acid and a weak base. Preferred zinc compounds are zinc oxide and zinc carbonate. More preferred is zinc oxide. Preferred weak bases are ammonium bicarbonate and ammonium hydroxide. More preferred is ammonium bicarbonate.

The following examples are given merely as illustrative of the present invention and are not to be considered as limiting. All percentages and parts throughout the application are by weight unless otherwise specified.

EXAMPLE 1

A phenol-limonene addition product was prepared by reacting 500 grams of phenol with 140 grams of d-limonene, overnight, at a temperature of less than about 5° C. in the presence of a $BF_3.(Et)_2O$ catalyst. The reaction mixture was neutralized and steam distilled to remove unreacted phenol. A 200 gram portion of the isolated addition product was heated to a temperature of about 165° C., with stirring, and to this was added a dry mixture of 8.0 grams of zinc oxide, 22.8 grams of benzoic acid and 14.8 grams of ammonium bicarbonate over a 49 minute period. The stirring mixture was held at a temperature of 165°–175° C. for an additional 71 minutes after the addition of the dry mixture was completed.

EXAMPLES 2–8

In procedures substantially like that of Example 1, seven different addition products of phenol and terpene were zinc modified.

Each of the eight zinc-modified addition products, and the eight addition products prior to zinc modification (controls), were individually crushed and dispersed at 54% solids in water and a small amount of dispersant for about 45 minutes to a particle size range of about 3–14 microns.

Each of these dispersions was then individually formulated into a coating mixture with the materials and dry parts listed in Table 1.

TABLE 1

| Material | parts, dry |
|---|---|
| Addition Product | 9.12 |
| Kaolin Clay | 38.96 |
| Calcined Kaolin Clay | 3.60 |
| Corn Starch Binder | 4.50 |
| Styrene-butadiene Latex Binder | 3.60 |
| Dispersant | 0.22 |

Sufficient water was added to the above composition to produce a 30% solids mixture. Each coating mixture was applied to a paper substrate with a #9 wire-wound coating rod and the coating was dried by the application of hot air, producing a dry coat weight of about 5.9–7.4 grams per square meter.

Each of the resulting CF sheets was tested in a Typewriter Intensity (TI) test with CB sheets comprising a coating of the composition listed in Table 2 applied as an 18% solids dispersion to a paper base using a No. 12 wire-wound coating rod.

TABLE 2

| Material | % Dry |
|---|---|
| Microcapsules | 74.1% |
| Corn Starch Binder | 7.4% |
| Wheat Starch Particles | 18.5% |

The microcapsules employed contained the color former solution of Table 3 within capsule walls comprising synthetic resins produced by polymerization methods utilizing initial condensates as taught in U.S. Pat. No. 4,100,103.

TABLE 3

| Material | Parts |
|---|---|
| 7-(1-ethyl-2-methylindol-3-yl)-7-(4-diethylamino-2-ethoxyphenyl)-5,7-dihydrofuro [3,4-b] pyridin-5-one | 1.70 |
| $C_{10}$–$C_{13}$ alkylbenzene | 78.64 |
| sec-butylbiphenyl | 19.66 |

In the TI test a standard pattern is typed on a coated side-to-coated side CB-CF pair. After the image develops overnight, the intensity is measured and reported as color difference.

The Hunter Tristimulus Colorimeter was used in these Examples to measure color difference, a quantitative representation of the ease of visual differentiation between the colors of two specimens. The Hunter Tristimulus Colorimeter is a direct-reading L, a, b instrument. L, a, b is a surface color scale (in which L represents lightness, a represents redness-greenness and b represents yellowness-blueness) and is related to the CIE tristimulus values, X, Y and Z, as follows:

$$L = 10Y^{\frac{1}{2}}$$

$$a = \frac{17.5\,[(X/0.98041) - Y]}{Y^{\frac{1}{2}}}$$

$$b = \frac{7.0\,[Y - (Z/1.18103)]}{Y^{\frac{1}{2}}}$$

The magnitude of total color difference is represented by a single number ΔE and is related to L, a, b values as follows:

$$\Delta E = [(\Delta L)^2 + (\Delta a)^2 + (\Delta b)^2]^{\frac{1}{2}}$$

where $\Delta L = L_1 - L_o$ $\Delta a = a_1 - a_o$ $\Delta b = b_1 - b_o$ $L_1$, $a_1$, $b_1$=object for which color difference is to be determined.

$L_o$, $a_o$, $b_o$=reference standard.

The above-described color scales and color difference measurements are described fully in Hunter, R. S. "The Measurement of Appearance", John Wiley & Sons, New York, 1975.

In Table 4 are listed Examples 1-8 (zinc-modified addition products) and Controls 1-8 (addition products prior to zinc modification) and their respective image intensities after 3 hours and 24 hours of development, reported as ΔE.

For this particular configuration of carbonless copy paper, a ΔE greater than about 20 is required for an acceptably intense image. As can be seen from Table 4, zinc modification of the addition products produced substantially enhanced image intensities. Furthermore, zinc modification of certain addition products, which would otherwise be unacceptably low in image intensity, raises these addition products to an acceptable image intensity level. Compare Controls 2, 5 and 8 with Examples 2, 5 and 8. Additionally, certain addition products have substantially higher image intensities at 24 hours than at 3 hours, indicating lower than desirable print speeds. Zinc modification, surprisngly, improved the print speed of these materials.

TABLE 4

| Example | Zinc-Modified | Olefin | 3 Hr. | 24 Hr. |
|---|---|---|---|---|
| 1 | Yes | limonene | 40.96 | 39.40 |
| Control 1 | No | limonene | 35.37 | 35.42 |
| 2 | Yes | terpene | 21.39 | 22.28 |
| Control 2 | No | terpene | 9.13 | 9.00 |
| 3 | Yes | terpene | 42.76 | 42.95 |
| Control 3 | No | terpene | 31.54 | 34.89 |
| 4 | Yes | terpene | 44.71 | 44.38 |
| Control 4 | No | terpene | 27.71 | 33.60 |
| 5 | Yes | terpene | 43.13 | 43.25 |

TABLE 4-continued

| Example | Zinc-Modified | Olefin | 3 Hr. | 24 Hr. |
|---|---|---|---|---|
| Control 5 | No | terpene | 19.16 | 22.86 |
| 6 | Yes | terpene | 38.99 | 38.40 |
| Control 6 | No | terpene | 27.01 | 27.76 |
| 7 | Yes | terpene | 41.92 | 41.68 |
| Control 7 | No | terpene | 40.19 | 40.97 |
| 8 | Yes | terpene | 31.07 | 30.31 |
| Control 8 | No | terpene | 6.43 | 6.84 |

The invention being thus described, it will be obvious that the same may be varied in many ways. Such variations are not to be regarded as a departure from the spirit and scope of the invention, and all such modifications are intended to be included within the scope of the following claims.

What is claimed is:

1. A color developer obtained by the process comprising mixing together and heating an addition product of phenol and a diolefinic alkylated or alkenylated cyclic hydrocarbon, zinc oxide, benzoic acid and ammonium hydroxide.

2. The color developer of claim 1 wherein the cyclic hydrocarbon is a terpene.

3. The color developer of claim 2 wherein the terpene is limonene.

4. A color developer prepared by a process comprising mixing and heating an addition product of phenol and a diolefinic alkylated or alkenylated cyclic hydrocarbon, a zinc compound selected from the group consisting of zinc oxide and zinc carbonate, benzoic acid and a weak base.

5. The color developer of claim 4 wherein the cyclic hydrocarbon is a terpene.

6. The color developer of claim 5 wherein the terpene is limonene.

7. The color developer of claim 4 wherein the weak base is selected from the group consisting of ammonium bicarbonate and ammonium hydroxide.

8. The color developer of claim 7 wherein the weak base is ammonium bicarbonate.

9. The color developer of claim 8 wherein the zinc compound is zinc oxide.

10. A color developer composition comprising a zinc-modified addition product prepared by a process comprising mixing together and heating an addition product of phenol and a diolefinic alkylated or alkenylated cyclic hydrocarbon, a zinc compound selected from the group consisting of zinc oxide and zinc carbonate, benzoic acid and a weak base.

11. The composition of claim 10 wherein the cyclic hydrocarbon is a terpene.

12. The composition of claim 11 wherein the terpene is limonene.

13. The composition of claim 10 wherein the weak base is selected from the group consisting of ammonium bicarbonate and ammonium hydroxide.

14. The composition of claim 13 wherein the weak base is ammonium bicarbonate.

15. The composition of claim 14 wherein the zinc compound is zinc oxide.

* * * * *

UNITED STATES PATENT AND TRADEMARK OFFICE
CERTIFICATE OF CORRECTION

PATENT NO. : 4,610,727

DATED : September 9, 1986

INVENTOR(S) : Jerome R. Bodmer et al.

It is certified that error appears in the above-identified patent and that said Letters Patent are hereby corrected as shown below:

Column 6, line 28, after "mixing" insert --together--.

Signed and Sealed this

Twentieth Day of January, 1987

*Attest:*

DONALD J. QUIGG

*Attesting Officer* *Commissioner of Patents and Trademarks*